United States Patent [19]

Raisbeck

[11] Patent Number: 4,909,709

[45] Date of Patent: Mar. 20, 1990

[54] THROTTLE/PROPELLER MIXER CAM

[76] Inventor: James D. Raisbeck, 7536 Seward Park Ave., S., Seattle, Wash. 98118

[21] Appl. No.: 209,841

[22] Filed: Jun. 22, 1988

[51] Int. Cl.[4] .............................................. B64C 11/40
[52] U.S. Cl. ....................................... 416/25; 416/46; 416/48
[58] Field of Search ...................... 416/25, 27, 29, 46, 416/49, 48

[56] References Cited

U.S. PATENT DOCUMENTS

| 2,628,684 | 2/1953 | Slatter et al. | 416/27 |
|---|---|---|---|
| 2,781,856 | 2/1957 | Danvers et al. | 416/27 |
| 2,808,891 | 10/1957 | Stuart | 416/27 |
| 2,986,222 | 5/1961 | Biermann | 170/160.2 |
| 3,163,233 | 12/1964 | Lambeck | 416/48 X |
| 3,167,131 | 1/1965 | Voisard | 170/160.31 |
| 3,249,159 | 5/1966 | Biermann | 170/160.2 |
| 3,261,405 | 7/1966 | Andrews | 416/27 |
| 3,356,152 | 12/1967 | Accorsi | 416/27 |
| 3,380,535 | 4/1968 | Biermann | 170/160.2 |
| 3,387,664 | 6/1968 | Cummings | 170/160.23 |
| 3,389,641 | 6/1968 | Barnes | 91/366 |
| 3,446,289 | 5/1969 | Morris | 170/160.2 |
| 3,551,069 | 12/1970 | Morris | 416/27 |
| 3,575,529 | 4/1971 | Bierman | 416/27 |
| 4,533,296 | 8/1985 | Duchesneau | 416/47 X |
| 4,626,170 | 12/1986 | Dorsch | 416/29 |
| 4,648,798 | 3/1987 | Voisard | 416/48 |

FOREIGN PATENT DOCUMENTS 911021 11/1962 United Kingdom .................. 416/27

Primary Examiner—Everette A. Powell, Jr.
Attorney, Agent, or Firm—Christensen, O'Connor, Johnson & Kindness

[57] ABSTRACT

A cam mechanism enabling the pilot to automatically advance the propeller low pitch stop with the engine power lever on airplanes with multibladed propeller systems having a beta control mechanism for adjusting the blade angle. The cam provides an inexpensive and reliable alternative to costly and complex automatic feathering systems.

15 Claims, 4 Drawing Sheets

THROTTLE/PROPELLER MIXER CAM

BACKGROUND OF THE INVENTION

The present invention relates to controllable-pitch aircraft propellers, particularly to such propellers which are adapted to be operated with engines having a beta pitch-control mechanism, such as the Pratt & Whitney PT 6A engine series. More particularly, the invention relates to featherable and reversible turbo propellers whose low pitch stop is established by a beta control valve.

The propeller control system to which the present invention is applied is basically the system as shown in U.S. Pat. No. 3,249,159, issued May 3, 1966, to Biermann and U.S. Pat. No. 3,446,289, issued May 27, 1969, to Morris, Jr., in which the blade position is transmitted to a valve (a beta valve) through a mechanical feedback arrangement carried on the propeller. Conventionally, the beta valve is not modulated when the throttle control is advanced from the idle position to the full throttle position; in fact, in conventional propeller pitch control systems, the beta control valve is only modulated when the throttle control is moved from the idle position to the reverse position or vice versa. The propeller control system can also be of the type having an internal feedback to a beta rod such as shown in Biermann, U.S. Pat. No. 2,986,222, issued May 30, 1961 or Biermann, U.S. Pat. No. 3,380,535, issued Apr. 30, 1968.

Recent improvements in propeller design have resulted in the development of quieter, more efficient propellers having multiple blades, e.g. 4 or more. Although these propellers reduce noise and improved performance, they suffer from the drawback that the increased surface area of the propeller due to the increased number of blades results in a propeller that produces more drag than propellers having fewer blades.

In multiple-engine airplanes, the FAA requires that the airplane shall not fly below an established minimum control speed ($V_{MC}$). The $V_{MC}$ is defined as the minimum speed required to maintain directional heading when the critical engine is producing no power and the other engine is at maximum power and RPM. When higher drag multiple-bladed propellers are retrofitted onto existing airplanes, the $V_{MC}$ of the retrofitted airplane increases to values considerably higher than that which the airplane was originally certified. These increased $V_{MC}$ values normally result in the recertification of an airplane at a $V_{MC}$ that requires an unacceptably high take-off speed and field length. Therefore, in order to avoid the need to recertify the retrofitted aircraft and obtain the benefits of the multiple-bladed propellers, it is desirable to try and satisfy the original certification using the multiple-bladed propellers.

Previously, in order to satisfy the $V_{MC}$ requirements of the FAA, airplanes that were retrofitted with the quieter and more effective multibladed propellers required an automatic feather system. The automatic feather system senses reduced torque or horsepower output from the critical engine, while the throttle is requiring full power, and automatically features the propeller into the propeller's lowest drag position (blade streamlined with line of flight). By minimizing the drag of the propeller of the critical engine, the yawing moment around the airplane's vertical axis is reduced. In order to maintain a directional heading when the critical engine is without power, the rudder of the airplane must be used to provide a countering moment to the yawing moment. The ability of the rudder to avoid the yawing moment is a function of the speed of the airplane; as the yawing moment increases (i.e., increased drag on propeller of critical engine), the speed of the airplane must increase to enable the rudder to counteract the yawing moment. Thus, by minimizing the drag of the critical engine, the yawing moment is reduced, and accordingly, the airplane speed necessary to counteract the yawing moment and maintain a directional heading (i.e., the $V_{MC}$) is reduced to its lowest airspeed value; unfortunately, the automatic feathering systems are complex and costly to install and introduce an additional source of potential malfunction.

Therefore, in airplanes capable of being retrofitted with the state of the art multibladed propellers, as well as new aircraft using multibladed propellers, it would be desirable to provide a system that could replace the costly automatic feather devices and enable the airplane to maintain a $V_{MC}$ close to that for which is was originally certified or as low a $V_{MC}$ as can be obtained to help optimize takeoff and flight performance on airplanes of new design. The system should be simple to install and should provide substantially the same propeller blade angles as conventional systems when the airplane is at ground idle or in reverse.

SUMMARY OF THE INVENTION

The present invention is a less expensive alternative to the costly and complex automatic feather systems which have heretofore been required on airplanes being retrofitted with advanced technology multibladed propellers or on airplanes of new design using these propellers. The invention advances the propeller low pitch stop as the throttle control is advanced from the idle to the full throttle position without affecting the normally scheduled low pitch stop when the throttle control is in the idle or reverse position. The ability to advance (i.e. coarsen) the propeller low pitch stop in such a manner enables airplanes to utilize the advanced technology multibladed propellers or other propellers while maintaining a satisfactory $V_{MC}$ without the need for an expensive automatic feathering system of costly recertification of the aircraft's takeoff or flight performance.

The invention is applicable to a propeller pitch control system for a variable pitch hydraulic aircraft propeller having a propeller low pitch stop that is a function of the position of the throttle control in the cockpit. Normally, the pilot through a mechanical feedback arrangement to a beta valve, which is a part of a blade angle change mechanism known as a beta control system, can modulate the propeller low pitch stop by moving the throttle control between the idle position and the reverse position; however, prior to the present invention, the propeller low pitch stop was not modulated as the throttle control was moved between the idle position and the full throttle position.

The invention is a mixer cam connected to the throttle control, the mixer cam cooperates with the beta valve to modulate the propeller low pitch stop so that the low pitch stop is modulated when the throttle control is moved between an idle position and a full throttle position. The mixer cam includes a groove whose specific dimensions are such that movement of the throttle control between the idle position and the full throttle position modulates (e.g., coarsens) the propeller low pitch stop. The mixer cam can be easily installed into existing propeller pitch control systems, such as those found in Pratt and Whitney PT 6 A series engines.

Other objects, features, and advantages of the present invention will be readily apparent from the following description of certain preferred embodiments thereof, taken in conjunction with the accompanying drawings. It is to be understood that variations and modifications can be effected without departing from the spirit and scope of the novel concepts of the present invention.

DETAILED DESCRIPTION OF THE INVENTION

Figure 1:
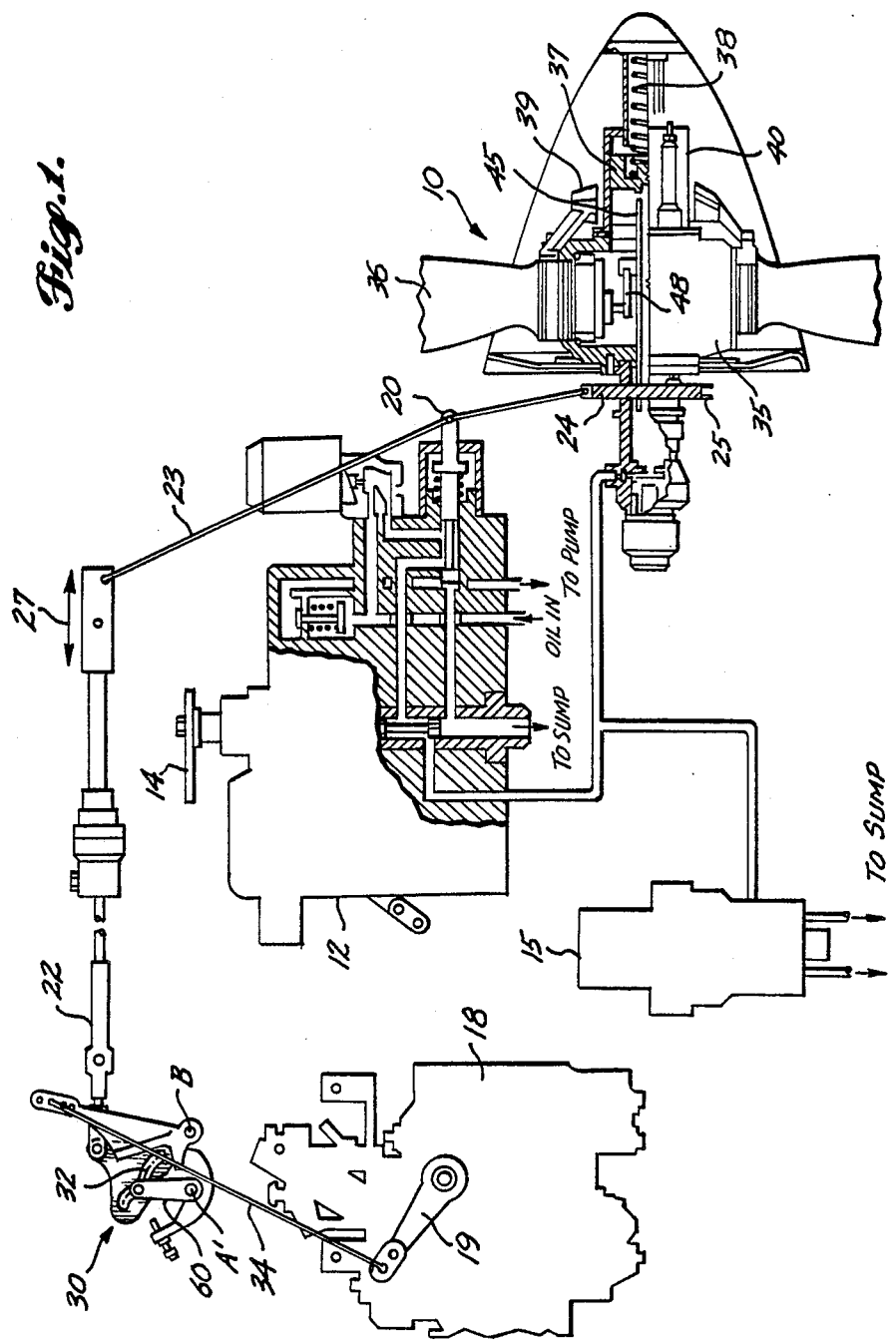
FIG. 1 is a partially schematic diagram of a throttle/propeller mixer cam of the present invention connected to a beta control system for reversing and feathering a propeller.

Referring to FIG. 1, a controllable, reversible pitch aircraft propeller is illustrated generally at 10. The propeller 10 to which the present invention is applied uses hydraulic pressure to move the blades to a low pitch position, and employs a spring and counterweights to carry the blades to higher pitch positions and to the feathered position.

The propeller 10 is controlled by a hydraulic control system which includes a source of oil under pressure. Under normal flight conditions, the oil is applied to the propeller through a governor assembly 12, in accordance with the pitch of the governor speed lever 14. A conventional propeller overspeed governor 15 is connected to dump fluid from the propeller to the sump, to permit the propeller to go to higher pitch settings in the event of overspeed conditions. The fuel governor 18 controls the amount of fuel to a turbine engine, not shown, by means of a fuel control lever 19. The governor assembly 12 includes a beta valve 20, also connected to apply hydraulic fluid to the propeller 10 through the internal passageways in the governor assembly 12. The beta valve 20 may be initially positioned by a push/pull control rod 22 operating through a floating reversing lever 23. The opposite end of the floating reversing lever 23 is connected to a slider brush or block 24 which runs in a groove in a beta position feedback collar 25 carried on the propeller 10. The pilot's power levers (not shown) are connected to the push/pull control rod 22 through the propeller/throttle mixer cam 30 of this invention and cam follower lever 60.

The propeller 10 has a hub 35 in which a plurality of propeller blades 36 are mounted, typically three or more. The position of the propeller blades is controlled by a fluid motor piston 37 opposed by the spring 38 and conventional counterweights 39. Applying hydraulic fluid to the propeller causes the blades 36 to move to a lower pitch position and into reverse pitch positions, while the spring 38 and counterweights 39 carry the blades 36 toward the high pitch and into the feather positions.

In most flight operations, the pitch of the propeller blades 36 is controlled by the flyweight governor contained within the governor assembly 12. The governor itself is of conventional construction including the usual flyweights operating against an internal speeder ring. The speeder ring is biased by the speed-adjusting leer 14, controlled by the pilot. However, in the beta range, during low and reverse pitch conditions, and when the governor is operating too slowly to be a governing factor, the pitch of the propeller may be directly controlled by the pilot by movement of the rod 22 through the throttle/propeller mixer cam 30 in cooperation with the pilot's power levers. This results in a shifting of the spool of the beta valve 20. Pulling the push/pull control rod 22 to the left, as viewed in FIG. 1, causes an opening movement of the beta valve 20, with concurrent application of hydraulic fluid to the piston 37. This causes the piston 37 to bring the propeller blades to a lower pitch position, accompanied by concurrent movement of the collar 25 and the floating lever 23 forwardly in such a manner as to reclose the beta valve 20. The throttle/propeller mixer cam 30 is also connected to the fuel lever 19 through a push/pull connecting rod 34 to control the turbine fuel governor, so as to reschedule fuel in the ground idle and reverse positions, as well as for forward flight.

The piston 37 is slidably mounted in a cylinder dome 40 for movement under the influence of hydraulic pressure against counterweights 39 and against a spring 38. Hydraulic operating fluid is fed through an internal hollow piston or tube 45. The movement of the piston 37 is translated to the blades 36 through connecting lines 48, which are connected to the blade root ends near the trailing edge of each blade.

The throttle/propeller mixer cam 30 of the present invention enables the pilot to modulate the beta valve by movement of the rod 22 through the movement of the throttle control between an idle position and a full throttle position. Heretofore, conventional cam mechanisms have not been designed to allow the pilot to effectively modulate the beta valve and, accordingly, modulate the low pitch stop, as the throttle control is moved between the idle position and the full throttle position. That is, conventional cam mechanisms only enable the pilot to modulate the beta valve as the throttle controls are moved between the idle position and the reverse position.

By advancing the rod 22 to the right in FIG. 1, the beta valve 20 will initially block the high-pressure oil supply from the governor assembly 12 to the propeller piston. Further forward axial motion of the beta valve 20 will dump oil from the propeller piston 37 to the engine sump. The advancement of the beta valve 20 results in an advancement (coarsening) of the propeller low pitch stop.

The details of the throttle/propeller mixer cam 30 and how it cooperates with the throttle controls, rod 22 and lever 23 to advance the beta valve 20 is described hereinbelow. It should be understood that the operation of the governor 12, propeller overspeed governor 15, fuel governor 18, beta valve 20, and propeller assembly 10 are conventional and that the present invention through the inventive throttle/propeller mixer cam provides a unique means of scheduling the cooperation between these components.

Figure 2:
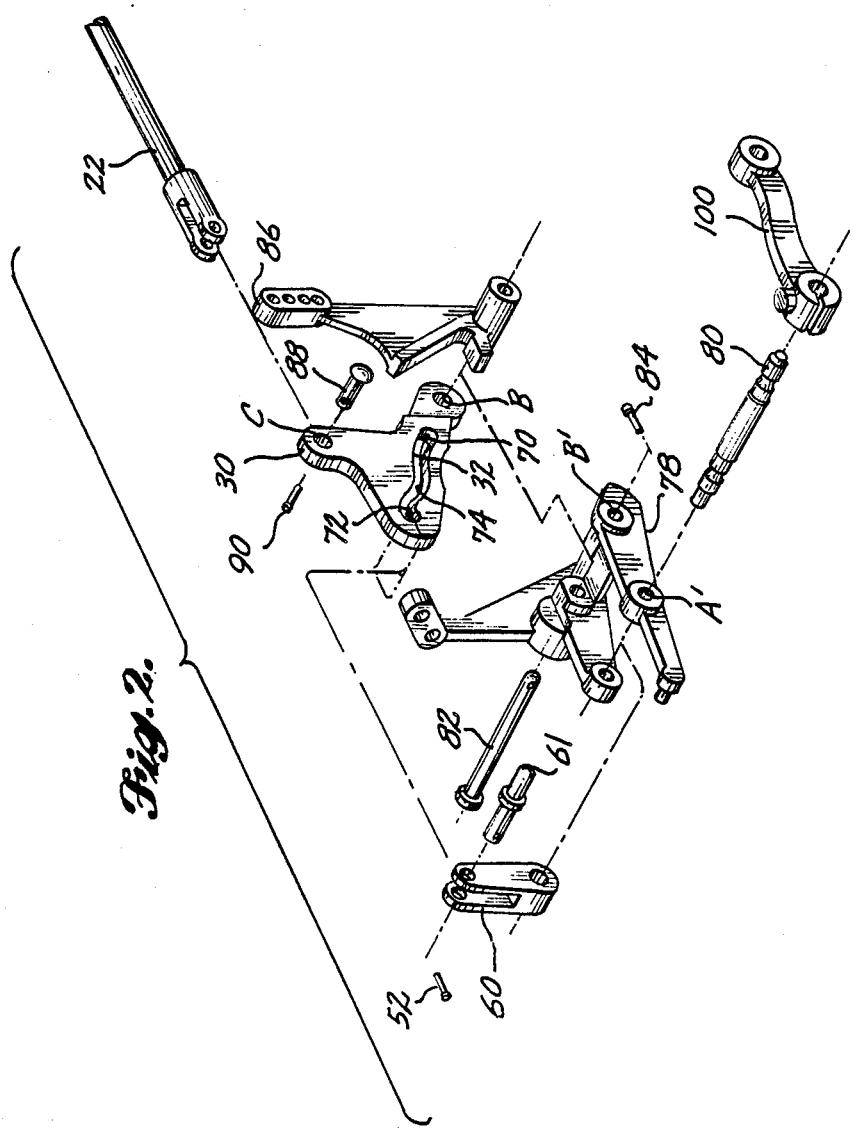
FIG. 2 is an exploded, isometric, view of the throttle/propeller mixer cam in accordance with the present invention and selected components of a beta control system.
Figure 3:
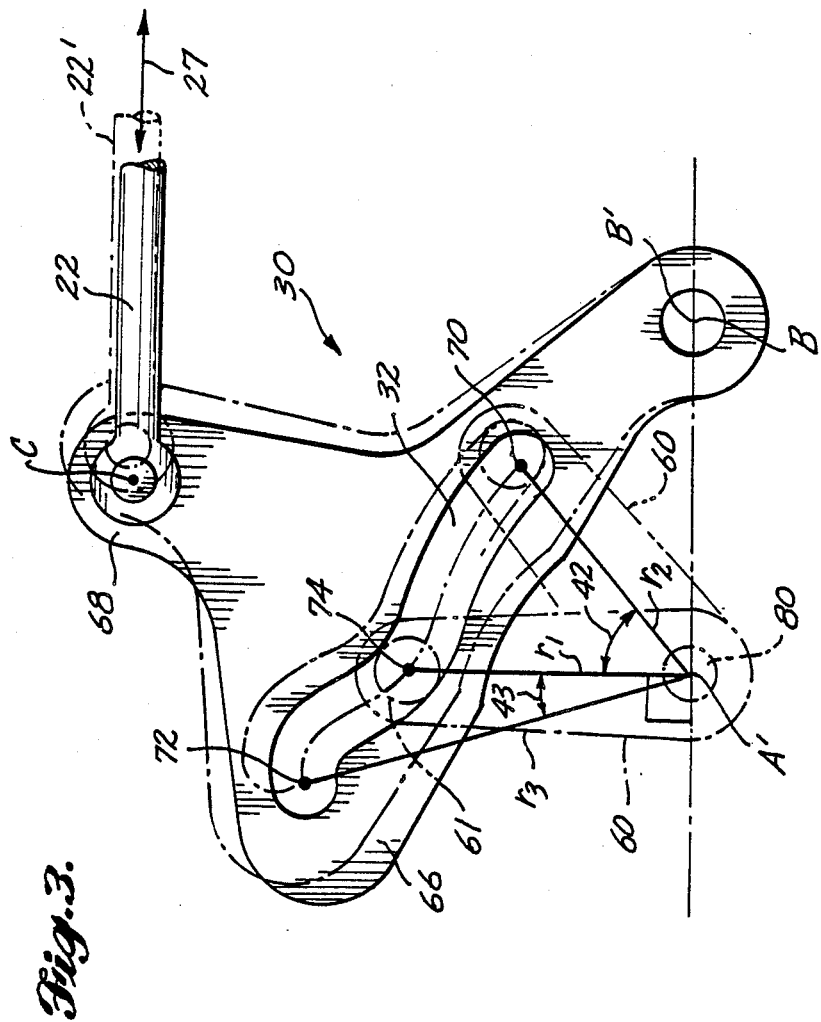
FIG. 3 is a side elevational view of the throttle/propeller mixer cam in accordance with the present invention.

Referring to FIGS. 2 and 3, a throttle/propeller mixer cam 30 in accordance with the present invention includes an arcuate groove 32 having a full throttle position 70 at its rightmost end in FIGS. 2 and 3, a reverse position 72 at its leftmost end in FIGS. 2 and 3, and an idle position 74 intermediate the full throttle and reverse positions.

The cam 30 is a substantially flat member in the plane of FIG. 3 and includes an elongated lower portion 66 including the groove 32 and an upper arm 68 roughly centered above the groove, extending from the top of the elongated body. In the upper end of the arm 68 is a horizontal bore having an axis that defines a pivot C. The right-hand end of the elongate portion of the cam 30 in FIG. 3, includes a horizontal bore having an axis that defines a pivot B. The cam 30 is provided in a vertical plane about pivot B in a conventional control lever mounting bracket 78 having a horizontal bore having an axis that defines a pivot B' which coincides with pivot B when the cam 30 is mounted in the bracket 78 by pin 82 and cotter pin 84. A conventional fuel control unit actuating lever 86 is also pivoted about pivot B' in a similar manner. The mounting bracket 78 includes another horizontal bore having an axis that defines a pivot A' to the left of and in the same plane as pivot B' in FIG. 2. A conventional cam follower lever 60 is pivoted in a vertical plane around pivot A' on one end of a horizontal rotating pin 80. On the end of the rotating pin 80 opposite the cam follower lever 60 is mounted a throttle control lever 100 which is connected to the throttle control within the cockpit. The horizontal pin 80 is longitudinally mounted along pivot A' within the mounting bracket 78 so that rotation of the control lever 100 about pivot A' is translated to a rotational movement in a vertical plane of the cam follower lever 60 about pivot A'. The end of the cam follower lever 60 opposite the pin 80 includes two spaced-apart arms 76 between which the elongate portion of the cam 30 can easily slide. The arms of the cam follower lever 60 are positioned on opposite sides of the cam 30 by horizontally passing a pin 61 through the first arm, then through the groove 32 and finally through the second arm. The pin 61 is securely fastened by cotter pin 52 so that the cam follower lever is slidably engaged in the groove 32.

The pivot C at the top of the arm 68 is connected to a push/pull control rod 22 by pin 88 and cotter pin 90, the opposite end of the rod 22 cooperates with the floating lever and beta valve (not shown) to adjust the propeller low pitch stop. The throttle control levers (not shown) are thus connected to the beta valve through the throttle control lever 100, pin 80, cam follower lever 60, pin 61, groove 32, cam 30, push/pull rod 22 and floating lever 23. Except for the cam 30, particularly the groove 32 in the cam 30, each of the other structures is similar to those found in a conventional Pratt & Whitney PT 6A engine series whose blade angle is partially controlled by a beta pitch control mechanism. The details of the throttle/propeller mixer cam 30 and particularly the groove 32 are described below primarily with reference to FIGS. 3 and 4.

Referring to FIG. 3, cam 30 is illustrated in an isolated view in order to simplify the description of the inventive concept as it relates to the groove 32. Cam follower lever 60 is illustrated by the ghost lines in order to provide the reference pivot A' for measuring the various radii of the groove 32. It is important to understand that the cam follower lever 60 has a fixed length and is pivoted about pivot A' which is a fixed distance from, and coplanar with, the coincident pivots B and B' (B/B'). Because the radii of the groove 32 from pivot A' changes as the cam 30 is rotated about pivot B/B', it is necessary to describe the cam 30 and groove 32 with reference to a fixed position. For purposes of the following description, the fixed position corresponds to the cam follower lever 60 in a vertical position, normally associated with the cam follower lever 60 in the idle position 74 within the groove 32. It should be understood that the various radii and their relative lengths can change as the cam 30 is rotated about pivot B/B'; the benefits of the present invention are obtained so long as the groove 32 is dimensioned or positioned relative to the cam follower lever 60 such that movement (e.g., advancement) of the cam follower lever 60 between the idle position 74 and the full throttle position 70, modulates (e.g., advances) the beta valve and, accordingly, modulates (e.g., advances) the propeller low pitch stop.

The following description of the cam 30 refers to three particular radii: a first radius, $r_1$, defining the distance between pivot A' and the centerline of the groove at its idle position 74; a second radius, $r_2$, defining the distance between pivot A' and the centerline of the groove at its full throttle position 70; and a third radius, $r_3$, defining the distance between pivot A' and the centerline of the groove at its reverse position 72. Because $r_1$, $r_2$ and $r_3$, as described herein, are determined based on the position of the cam follower lever 60 when it is in a vertical position which is normally associated with the idle position 74, $r_1$ is equal to the distance between pivot A' and the axial center of the pin 61 when the cam follower lever 60 is mounted in the mounting bracket 230.

The present invention operates on the principle that any difference between the radii, $r_1$ and $r_2$ as defined herein, are accommodated by the cam 30 rotating to the left or right about pivot B/B' as the cam follower lever 60 rotates about pivot A' and moves within the groove 32. The rotation about pivot B/B' of the cam 30 results in a push or pull of the rod 22 which is secured to the cam 30 at pivot C. For example, when the cam follower lever 60 causes the cam 30 to rotate clockwise about pivot B/B', the push/pull rod 22 is pushed to the right in FIG. 3 as represented by the ghost lines 22'. The push or pull of the rod 22 moves the floating lever 23 (in FIG. 1) which moves the beta valve in an axial motion, thus modulating the propeller low pitch stop.

The portion of the groove between radii $r_3$ and $r_1$ represented by the angle 43, schedules the cooperation of the fuel control levers and the beta valve in a conventional manner. Therefore, the cam 30 of the present invention does not affect the propeller low pitch stop as it relates to the throttle control when it is in a reversing or idle position or moving therebetween. However, unlike conventional cam mechanisms, the groove 32 in the throttle/propeller mixer cam 30 of the present invention is dimensioned so that the propeller low pitch stop is modulated as the throttle control is moved between the idle position and the full throttle position.

For the throttle/propeller mixer cam 30 as shown in FIG. 3, $r_2$ is less than $r_1$. Therefore, as the cam follower lever 60 is rotated from the idle position 74 to the full throttle position 70 by the clockwise rotation of rod 80 about pivot A' (in FIG. 2) the entire cam 30 is pushed clockwise about pivot B/B' in FIG. 3 and pivot C is pushed upward and away from pivot A' as indicated by the ghost lines 22'. This results in a push on rod 22 which advances the propeller low pitch stop by modulating the beta valve. The amount by which $r_2$ is less than $r_1$ is primarily dependent upon the desired distance one intends to advance the rod 22 and accordingly the propeller low pitch stop. For instance, when the length of $r_2$ is about 7.0 percent less than the length of $r_1$, an advancement of the propeller low pitch stop of about 12° is achieved. As the length of $r_2$ decreases and the length of $r_1$ remains the same, the amount by which the propeller low pitch stop can be modulated will increase and, vice versa, as the length of $r_2$ approaches the length of $r_1$, the amount by which the propeller low pitch stop can be modulated decreases. The maximum amount by which the propeller low pitch stop can be coarsened will be limited by primarily considering the ability of the propeller to reach the recommended maximum RPM through continuing advancement of the throttle prior to reaching the recommended maximum torque of the engine.

With regard to the portion of the groove between the angle 42, the change of the radius from pivot A' to the centerline of the groove between $r_1$ and $r_2$, is continuous with respect to the change in angle 42. Generally, this means that the surface within the groove is smooth, free of any discontinuities between $r_1$ and $r_2$.

Although the throttle/propeller mixer cam has been described hereinabove with regard to a cam that includes a groove defined by an idle position radius, $r_1$, and a full-throttle position radius, $r_2$, wherein $r_2$ is less than $r_1$, the cam is equally applicable in systems wherein it may be necessary that the radius defining the full throttle position, $r_2$, be greater than the radius defining the idle position, $r_1$, in order to advance the propeller low pitch stop. This may be the case where the groove is pivoted about a point to the rear of the groove or where the position of the parts are consistently reversed. In such cases, it will be necessary that $r_1$ and $r_2$, as defined herein be unequal in order to modulate the propeller low pitch stop when the throttle control is moved between the idle position and the full throttle position.

Figure 4A:
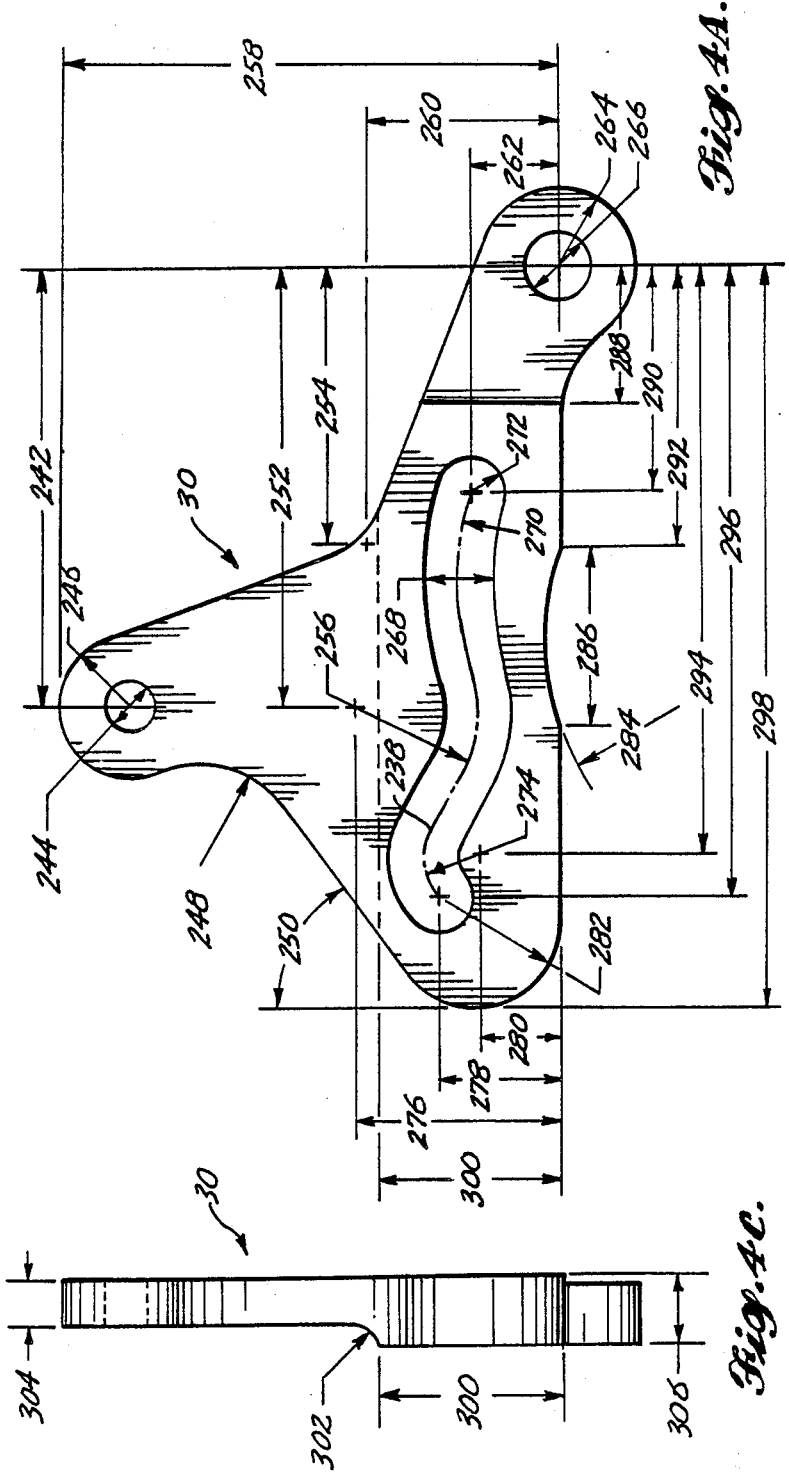
FIG. 4A is a plan view of the throttle/propeller mixer cam in accordance with the present invention.
Figure 4B:
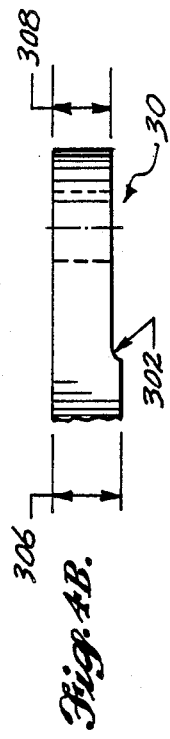
FIG. 4B is a side elevational view of a portion of the cam of FIG. 4A.
Figure 4C:
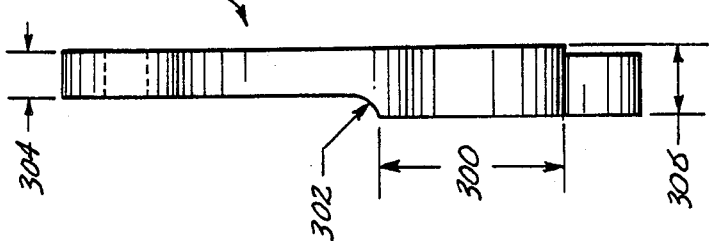
FIG. 4C is a side elevational view of the cam of FIG. 4A.

Referring to FIGS. 4A–C, and Table 1 below, the dimensions of a preferred cam 30 including groove 32 which can be retrofitted into a Pratt and Whitney Pt 6 A engine series are described.

TABLE I

| Reference Numeral | Dimension (inches unless otherwise specified) |
| --- | --- |
| 242 | 1.585 |
| 244 | 0.194–0.190 |
| 246 | 0.25 |
| 248 | 0.38 |
| 250 | 53° |
| 252 | 1.572 |
| 254 | 0.99 |
| 256 | 0.382 |
| 258 | 1.561 |
| 260 | 0.71 |
| 262 | 0.322 |
| 264 | 0.28 |
| 266 | 0.25–0.251 |
| 268 | 0.253–0.247 |
| 270 | 1.125 |
| 272 | 0.1265–0.1235 |
| 274 | 0.226 |
| 276 | 0.658 |
| 278 | 0.434 |
| 280 | 0.250 |
| 282 | 0.31 |
| 284 | 0.99 |

TABLE I-continued

| Reference Numeral | Dimension (inches unless otherwise specified) |
| --- | --- |
| 286 | 0.65 |
| 288 | 0.45 |
| 290 | 0.8 |
| 292 | 1.0 |
| 294 | 2.119 |
| 296 | 2.250 |
| 298 | 2.64 |
| 300 | 0.65 |
| 302 | 0.12 |
| 304 | 0.165–0.176 |
| 306 | 0.25 |
| 308 | 0.22 |

Although the above dimensions described a preferred cam, capable of coarsening the propeller low pitch stop about 12°, it should be understood that the present invention is not limited to these dimensions. One or ordinary skill in the art will be able to effect variations in the dimensions and coarsening of the propeller low pitch stop and still be within the scope of the present invention so long as the cam modulates the propeller low pitch stop as the throttle control is moved between the idle position and the full throttle position.

The throttle/propeller mixer cam of the present invention allows the quieter and more efficient multibladed propellers to be used on new aircraft designs or to replace conventional propellers having fewer blades without requiring certification at $V_{MC}$ values that dictate excessive takeoff lengths and speeds. The mixer cam is an inexpensive and effective replacement for the costly automatic feather systems, which heretofore have been required on airplanes that use the multibladed propellers. The cam can be easily retrofitted into many existing propeller pitch control systems.

One of ordinary skill, after reading the foregoing specification and claims, will be able to effect various changes, substitutions of equivalents, and other alterations without departing from the broad, inventive concepts disclosed herein. The claims should be construed broadly in light of the description to include all described embodiments and their equivalents, and should only be limited as required by the relevant prior art.

The embodiments of the invention in which an exclusive property or privilege is claimed are defined as follows:

1. In a propeller pitch control system for a variable pitch hydraulic aircraft propeller having a propeller low pitch stop which is a function of the position of a throttle control, said throttle control movable between an idle position and a full throttle position, the improvement comprising:

(a) a mixer cam, said mixer cam being connected to said throttle control, the position of the mixer cam being a function of the position of said throttle control;

(b) means for controlling the propeller low pitch stop including a beta valve connected to said mixer cam, the position of the mixer cam changing as said throttle control is modulated between the idle position and the full throttle position, the change in position of the mixer cam as the throttle control is moved between the idle position and the full throttle position causing the beta valve to modulate the low pitch stop.

2. The propeller pitch control system of claim 1, further comprising:

(c) a cam follower, said cam follower pivoted about a pivot A', said mixer cam including an arcuate groove for receiving the cam follower, said groove including an idle position and a full throttle position, said groove also having a first radius, $r_1$, defining the distance between pivot A' and the centerline of the groove at the idle position when the cam follower is in the idle position, a second radius, $r_2$, defining the distance between pivot A' and the centerline of the groove at the full throttle position when the cam follower is in the idle position, $r_1$ and $r_2$ being unequal.

3. The propeller pitch control system of claim 2, wherein the cam follower has a fixed length, the end of the cam follower opposite the pivoted end being received in the groove.

4. The propeller pitch control system of claim 2, wherein the difference between $r_1$ and $r_2$ is such that the propeller low pitch stop is coarsened at least about 12° when the throttle control is moved between the idle position and the full throttle position.

5. In a propeller pitch control system for a variable pitch hydraulic aircraft propeller having a propeller low pitch stop and reverse position controllable by a pilot through the position of a throttle control cooperating with a beta valve, said throttle control being movable between an idle position and a full throttle position, the improvement for coarsening the propeller low pitch stop as the throttle control is advanced from the idle position to the full throttle position comprising:
(a) a cam follower having a primary and a secondary end, said primary end of said cam follower connected to the throttle control and pivoted about a pivot A', the position of the cam follower being a function of the position of the throttle control;
(b) a mixer cam connected to the beta valve, said mixer cam including a groove for receiving the secondary end of said cam follower, said groove including an idle position and a full throttle position, said groove also having a first radius, $r_1$, defining the distance between pivot A' and the centerline of the groove at the idle position when the cam follower is in the idle position, a second radius, $r_2$, defining the distance between pivot A' and the centerline of the groove at the full throttle position when the cam follower is in the idle position, $r_1$ and $r_2$ being unequal, the cooperation between said groove and said cam follower causing said mixer cam to charge position as said cam follower is moved between the idle position and the full throttle position, the change in position of the mixer cam causing the beta valve to modulate the low pitch stop as the throttle control is moved between the idle position and the full throttle position.

6. The propeller pitch control system of claim 5, wherein the difference between $r_1$ and $r_2$ is such that the propeller low pitch stop is coarsened at least 12° when the throttle control is advanced from the idle position to the full throttle position.

7. The propeller pitch control system of claim 1, said propeller having at least four blades.

8. In a propeller pitch control system for a variable pitch hydraulic aircraft propeller having full reversing and feathering propellers and a propeller low pitch stop which is controllable by a pilot through the position of a beta valve that is a function of the position of a throttle control, said throttle control being movable between an idle position and a full throttle position, said throttle control cooperating with the beta valve through a cam connected to the beta valve capable of receiving a secondary end of a cam follower, a primary end of said cam follower being connected to the throttle control, said cam and cam follower cooperating so that said beta valve establishes the same propeller low pitch stop when the throttle control is in the idle position and the full throttle position, the improvement comprising:
using a mixer cam in place of said cam that is connected to the beta valve, said mixer cam cooperating with the cam follower to modulate the beta valve so that the propeller low pitch stop is coarsened as the throttle control is moved between the idle position and the full throttle position.

9. The propeller pitch control system of claim 8, wherein the mixer cam includes a groove for receiving the secondary end of said cam follower, said cam follower being pivoted about a pivot A', said groove including an idle position and a full throttle position, said groove also having a first radius, $r_1$, defining the distance between pivot A' and the centerline of the groove at the idle position when the cam follower is in the idle position, a second radius, $r_2$, defining the distance between pivot A' and the centerline of the groove at the full throttle position when the cam follower is in the idle position, $r_1$ and $r_2$ being unequal.

10. The propeller pitch control system of claim 5, wherein an angle $\theta$ separates $r_1$ and $r_2$, the change of the radius from the centerline of the groove to pivot A' between $r_1$ and $r_2$ being continuous with respect to $\theta$.

11. The propeller pitch control system of claim 9, wherein an angle $\theta$ separates $r_1$ and $r_2$, the change of the radius from the centerline of the groove to pivot A' between $r_1$ and $r_2$ being continuous with respect to $\theta$.

12. The propeller pitch control system of claim 9 wherein the difference between $r_1$ and $r_2$ is such that the propeller low pitch stop is coarsened at least 12° as the throttle control is advanced from the idle position to the full throttle position.

13. The propeller pitch control system of claim 2, wherein an angle $\theta$ separates $r_1$ and $r_2$, the change of the radius from the centerline of the groove to pivot A' between $r_1$ to $r_2$ being continuous with respect to $\theta$.

14. The propeller pitch control system of claim 1, wherein the propeller low pitch stop is coarsened when the throttle control is moved from the idle position to the full throttle position.

15. A throttle/propeller mixer cam having a configuration in plan view as shown in FIG. 4A.

* * * * *

UNITED STATES PATENT AND TRADEMARK OFFICE
CERTIFICATE OF CORRECTION

PATENT NO. : 4,909,709
DATED : March 20, 1990
INVENTOR(S) : James D. Raisbeck

It is certified that error appears in the above-identified patent and that said Letters Patent is hereby corrected as shown below:

| Column | Line | | |
|---|---|---|---|
| 1 | 33 | "improved" should be | --improve-- |
| 1 | 62 | "features" should be | --feathers-- |
| 3 | 2 | "PT 6 A" should be | --PT 6A-- |
| 4 | 9 | "leer" should be | --lever-- |
| 4 | 36 | "lines" should be | --links-- |
| 5 | 16 | "provided" should be | --pivoted-- |
| 7 | 45&46 | "Pt 6 A" should be | --PT 6A-- |
| 8 | 16 | "described" should be | --describe-- |
| 9 | 49 | "charge" should be | --change-- |

Signed and Sealed this

Twenty-eighth Day of April, 1992

Attest:

HARRY F. MANBECK, JR.

*Attesting Officer*      *Commissioner of Patents and Trademarks*